(12) United States Patent
Gentilcore

(10) Patent No.: US 6,836,711 B2
(45) Date of Patent: Dec. 28, 2004

(54) BICYCLE DATA ACQUISITION

(76) Inventor: Michael Leonard Gentilcore, 821 Keifer St., Apt. 7, Bethlehem, PA (US) 18015

( * ) Notice: Subject to any disclaimer, the term of this patent is extended or adjusted under 35 U.S.C. 154(b) by 0 days.

(21) Appl. No.: 10/117,002

(22) Filed: Apr. 5, 2002

(65) Prior Publication Data

US 2003/0191567 A1 Oct. 9, 2003

(51) Int. Cl.$^7$ ............................................... G01C 21/28
(52) U.S. Cl. ........................... 701/35; 701/70; 701/214; 280/210; 702/149
(58) Field of Search ........................... 701/35, 214, 213, 701/216, 70, 201; 180/183, 196, 182, 186, 180; 280/15, 16, 220, 200, 210; 482/4, 5; 702/149, 142, 41, 127, 141; 340/427, 432, 441

(56) References Cited

U.S. PATENT DOCUMENTS

| | | | |
|---|---|---|---|
| 4,430,800 A | | 2/1984 | Shimano |
| 5,137,501 A | * | 8/1992 | Mertesdorf .................. 482/57 |
| 5,222,690 A | * | 6/1993 | Jeffords ....................... 244/1 R |
| 5,364,271 A | * | 11/1994 | Aknin et al. .................. 434/61 |
| 6,002,982 A | * | 12/1999 | Fry ............................. 701/213 |
| 6,066,075 A | * | 5/2000 | Poulton ......................... 482/8 |
| 6,073,736 A | * | 6/2000 | Franklin ................ 188/322.15 |
| 6,152,856 A | * | 11/2000 | Studor et al. ................... 482/8 |
| 6,192,300 B1 | | 2/2001 | Watari |
| 6,450,922 B1 | * | 9/2002 | Henderson et al. ............. 482/8 |
| 2001/0030408 A1 | * | 10/2001 | Miyoshi ..................... 280/276 |
| 2001/0035817 A1 | * | 11/2001 | Mizuta ........................ 340/438 |

OTHER PUBLICATIONS

J. Friel, "Training with Power", Aug. 2001.
http://www.srm.de/powermeter.html.
www.srm.de/mtbpowermeter.html.
www.srm.de/openpm.html.
www.srm.de/mulcrank.html.
www.srm.de/ergomet.html.
www.srm.de/srmsoftware.html.
www.srm.de/srmanalysis.html.
www.srm.de/daten.html.
www.srm.de/aeno.html.
www.srm.de/torque.html.
www.srm.de/online.html.
www.srm.de/onlinemoniton.html.

* cited by examiner

Primary Examiner—Thomas G Black
Assistant Examiner—Ronnie Mancho
(74) Attorney, Agent, or Firm—Terry B. Morris

(57) ABSTRACT

An apparatus and method are provided which enables a performer to enhance performance evaluation of performing with a human-powered vehicle having one or more wheel(s) wherein measurements of (1) position, velocity and acceleration of said vehicle out of a starting gate and, optionally, one or more corner(s) of a performance track and, optionally, (2) position, velocity and acceleration and/or conservation of momentum of said vehicle over one or more various obstacles within the performance track are made with a resolution of sufficient sensitivity to make such improvements. The invention has particular application in cycling activities, such as BMX cycling.

13 Claims, 18 Drawing Sheets

X1(t), IN FEET

V1(t), IN FEET/SECONDS

A1(t), IN FEET/(SECONDS X SECONDS)

X2(t), IN FEET

V2(t), IN FEET/SECONDS

A2(t), IN FEET/(SECONDS X SECONDS)

- ☐ X2(t), IN FEET
- ○ V2(t), IN FEET/SECONDS
- △ A2(t), IN FEET/(SECONDS X SECONDS)
- ■ X2:4 POINTS PER REVOLUTION
- ● V2:4 POINTS PER REVOLUTION
- ▲ A2:4 POINTS PER REVOLUTION

- X(t), IN FEET
- V(t), IN FEET/SECONDS
- A(t), IN FEET/(SECONDS X SECONDS)

[LEFT VERTICAL BAR VALUES]

—— X2(t), IN FEET RELATIVE TO X1(t) AS VERTICAL VALUE

—◯— LEFT CRANK POSITION (LEFT BAR VALUE)

—□— RIGHT CRANK POSITION (LEFT BAR VALUE)

—△— REVOLUTIONS PER MINUTE (LEFT BAR VALUE X 100)

—☐— LEFT CRANK POSITION (LEFT BAR VALUE)

—○— RIGHT CRANK POSITION (LEFT BAR VALUE)

—△— REVOLUTIONS PER MINUTE (LEFT BAR VALUE X 100)

BICYCLE DATA ACQUISITION

FIELD OF THE INVENTION

This invention relates to a vehicle data acquisition system capable to sense, measure and store data on position, velocity and acceleration. In particular the invention relates to bicycle data acquisition systems and, in one non-limiting particular use, to bicycle motocross application.

BACKGROUND

Bicycle motocross ("BMX") racing is a fast-paced sport in which the ability to accelerate quickly out of the starting gate and gain speed over the various obstacles is key to winning. Top BMX professionals have the ability to accelerate from 0 to 30 miles per hour in 60 feet. In many racing formats, a single race can last only 40 to 50 seconds. In this short time, multiple riders will start from a starting gate and traverse straight sections, banked curves, and obstacles. For instance, a race may involve 4 or 5 straightways, approximately 200 feet each in length, with straightways connected by banked turns, 60 to 80 feet in diameter, each straightway containing a variety of jumps, ranging from small, 2 feet high "speed bumps" to tall, 6 feet high double jumps in which riders can jump distances of thirty feet or more before landing. In these quick races with constant opportunity for mishap, one basic strategy is to get out in front of the other riders quickly and maintain position in order to reach the finish line first. A BMX bicycle is simplistic. Typically, the bicycle uses 20" diameter wheels, has one brake, and has a single gear ratio with a freewheel hub. The use of variable gears is allowed, but is not prevalent The bicycle typically weighs about 25 pounds, with a frame made of steel or aluminum. The components of the bicycle are mostly aluminum.

A data acquisition system suitable for assessing BMX racing performance must be able to resolve position from the starting gate within a fraction of an inch. For example, a 3 inch difference between two riders at any point during a sprint would be considered significant. To track subtle changes in performance, the maximum acceptable error would need to be limited to a small percentage of this distance, perhaps 1% or 0.03 inches. Of course, for a wheel that produces only one data point per revolution, as is typical of conventional systems, the position from the starting gate could only be determined within one wheel circumference or less. For a 20 inch wheel on a BMX bicycle, this translates into about 63 inches.

BMX racing is very different from other cycling disciplines. In addition to being able to accelerate quickly, a great deal of handling skills, skills akin to those of handling motorized motocross motorcycles, are required to negotiate a BMX race course. Riders strive to pedal as much as possible in between the jumps and corners, and if possible, will attempt to pedal over certain obstacles without hesitation. Riders strive to stay on the ground and jump as low as possible to save time. The riders also have the ability to "pump," or gain speed without pedaling by properly channeling their bodily momentum upon landing and over the various obstacles. The ability to pump can allow riders to greatly accelerate over sections of track where pedaling would be nearly impossible.

As with any athletic endeavor, the ability to accurately measure performance is the key to improvement. Two main performance measures in BMX racing are (1) acceleration out of the starting gate and corners, and (2) acceleration and/or conservation of momentum over the various obstacles. There has been no system designed specifically to measure these parameters for BMX performance assessment. Existing systems lack the required resolution to measure these quantities with sufficient accuracy to assist the rider in performance improvement.

Conventional cycling computers have the capability to record distance, crank speed and velocity. These systems typically use two single magnets, one on the wheel and one on the crank arm of the bicycle, to measure and display information for wheel and crank speed. These units also have the ability to compute average and maximum values over time. Conventional cycling computer systems do not provide adequate feedback for assessing BMX riding performance because they do not sample data with sufficient resolution.

There are a few systems that are significantly more advanced than conventional cycling computers. These systems were designed for road and track bike applications and not BMX applications. One system is produced by Schobere Rad Messtechnik (hereinafter "SRM") of Königskamp, Germany, which uses a strain-gage instrumented crank set to measure pedaling power. Data can be recorded at frequencies of 200 Hz. Wheel and crank position are measured using magnetic pulse switches, one sample per revolution, akin to conventional cycling computers. SRM provides an on-board computer (with telemetry option) to record detailed pedaling information. The SRM software then plots the data to show power output over time. It also performs calculations to assess pedaling efficiency/left-right leg output comparisons. The second example is the "Power-Tap" system, produced by Graber Products, Inc., of Wisconsin. The Power-Tap system is similar to the SRM system in that it records power output, only this time using an instrumented hub. Wheel and crank position are measured using pulse switches, one sample per revolution. This is similar to conventional cycling computers. The Power-Tap system has a slower sampling rate, providing a maximum sampling rate of one Hertz (Hz). Power-Tap recently issued a hub that will fit into a BMX frame.

While the advanced cycling computers described above offer distinct advantages over conventional systems, such as by having a higher sampling rate, they still do not provide a means by which detailed position versus time data can be obtained. Both systems still use the conventional magnet system that triggers only once per wheel revolution.

Even though BMX racers are very quick and powerful, the measurement of power output is a concept more relevant to road and track (velodrome) cycling than BMX racing. These cycling efforts take place over much larger distances than those encountered on a BMX bike. These bicycles are also geared much higher than BMX bicycles. BMX bikes are geared to "top out" in approximately 150 ft or ¾ of a straightaway, whereas a track rider will need to last several laps on a 333 meter track. One method by which road and track riders assess their fitness is by using relationships between heart rate and power output. The short duration of BMX races make these types of studies less meaningful, especially on short sprints, due to the lag time between exertion and heart rate elevation.

More importantly, the dynamics of BMX and track bike sprinting are very different from each other. Track bikes are closely sized to fit the rider. The bicycle's movement is mostly a function of leg movement. A BMX sprinter is a different case. In BMX, a rider has many degrees of freedom in regard to pedaling stance/form because they do not sit down and the seat is not close to the rider. Add in jumps with quickly changing surface angles, and the meaning of power, as well as its translation into how quickly a rider moves from point to point, becomes nebulous. While power measurement may be useful for comparative purposes in BMX training, or for analyzing some aspects of pedaling efficiency, it just does not sufficiently quantify all the variables that define how fast a rider is moving.

Most importantly, one should note that some of the greatest periods of acceleration on a BMX bike occur when essentially no power is being transferred through the drive chain (hub and/or crank) of the bicycle. One example is the weight of the rider being thrust forward at the start. This acceleration comes mainly from the momentum of the upper body, and is not fully transmitted to the drive chain until the 3rd or 4th pedal stroke. Another example is a rider "pumping" through a series of jumps without pedaling. Significant acceleration (enough to pass another rider on the track) can be obtained without rotating the crank set or loading the hub. In short, measurement of power does not sufficiently answer the most basic question of BMX performance assessment: how fast is a rider going from point A to point B?

What is needed is a method and apparatus to assist a bicycle rider to assess acceleration out of a starting gate and corners of a race track, and acceleration and/or conservation of momentum over obstacles.

SUMMARY OF THE INVENTION

The two performance measures of (1) acceleration out of a starting gate and corners of a race track, and (2) acceleration and/or conservation of momentum over obstacles are obtained through use of the present invention. An object of the present invention is to provide a bicycle instrumented with a data acquisition system to record detailed position versus time data. This data could then be manipulated to generate useful position, velocity, and acceleration curves with which to assess rider performance.

DESCRIPTION OF EMBODIMENTS OF THE INVENTION

Figure 1:
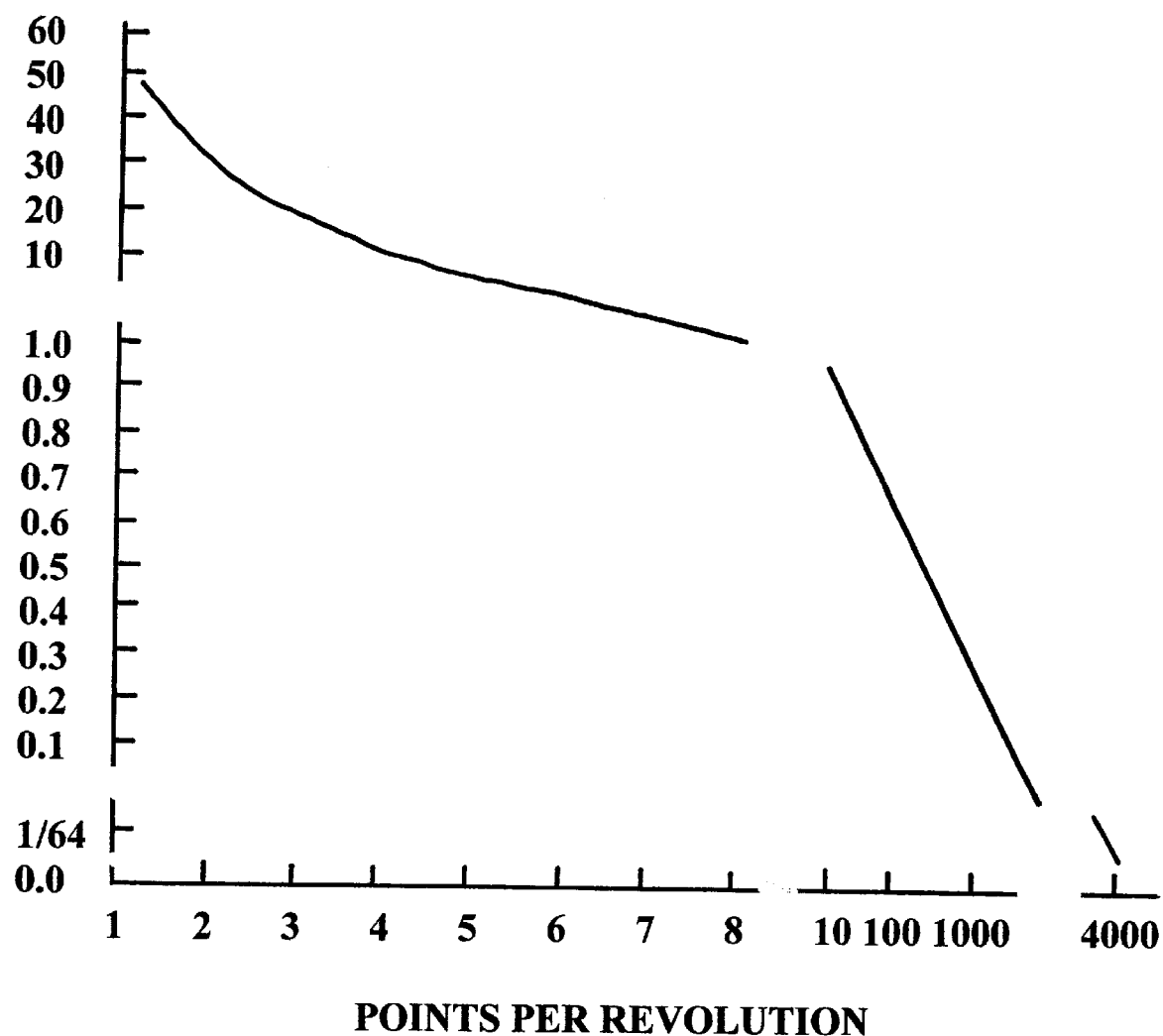
FIG. 1 depicts positioning errors as a function of points per revolution in a bicycle wheel.

One embodiment of the present invention is an apparatus comprising a wheel assembly comprising a wheel, a crank shaft assembly and two or more pedals attached to said crank shaft assembly, said crank shaft assembly in communication with said wheel, a meter assembly capable of producing a data set for determining the location, velocity and acceleration vectors relative to an initial time and an initial position, and a frame connected to said wheel assembly and said metering assembly. The meter assembly is one which is effective to produce a sensitivity in said data set to enable resolution of position, velocity, and acceleration vectors produced from force applied to each of said pedals and, optionally, said handlebar assembly. In a preferred embodiment, the apparatus further comprises a computer assembly capable of recording said data set and, optionally, the computer assembly is capable of calculating said position, velocity and acceleration vectors from said data set. In a variation embodiment, the meter assembly comprises an array of first metering devices mounted on said wheel and a second metering devices mounted on said crank shaft assembly or said frame so that said first and second metering devices interact to produce said data set. Preferably, the computer assembly on the cycle itself is able to interpret said data to determine the position, velocity, and acceleration vectors of the crank shaft and wheel.

Another embodiment of the present invention is a wheel assembly comprising a first wheel, two or more pedals and a crank shaft assembly, said crank shaft assembly in communication with said first wheel and said assembly comprising an array of first metering devices, a frame comprising a second metering device, said first and second metering devices capable of communicating with one another to produce a data set, a computer assembly capable of encoding and/or collecting the data set to determine the location, velocity and acceleration vectors relative to an initial time and an initial position, said first and second metering devices being effective to produce a sensitivity in said data set to enable resolution of acceleration vectors produced from force applied to each of said pedals. The data is sampled more often than once per wheel revolution. In a preferred embodiment, the sensitivity is at least about $\frac{1}{16}$ of a revolution of said first wheel or greater. For clarification by example, $\frac{1}{32}$ of a revolution provides a greater sensitivity than $\frac{1}{16}$ of a revolution.

An example of this embodiment is a bicycle having a typical configuration of two wheels and pedals, a frame, and a crank shaft assembly. Additional inventive elements are a means for measuring the force applied to the pedals and the location, velocity and acceleration relative to a set point. This starting point may be, but need not be, a designated point of the starting line of a race track. The means for measurement can be any suitable structural means for motion and/or force determination used on human-powered mobile equipment, or a mobile equipment equivalent device mounted on a stationary frame. The device should be capable of generating a digital or analogue signal which can be captured for instantaneous, transitory, and/or permanent storage and use. Representative, non-exhaustive examples of such are laser devices, Doppler radar devices, sonic detection devices and the like used in conjunction with encoders using magnetic forces, electric eyes, reflectance meters, mechanical switching devices, light density meters, amperage and voltage meters and the like types of sensing and sampling devices. Also useable are one or more transducers whic are located on one or more riding appararus and/or the ground to make measurements relative to one another. An example is one transduicer on the bike in ciommunication with a fixed transducer located on a ground site, such as a starting gate or other location. Such devices in combination may take readings from portions of the bicycle, such as hubs and spokes or surfaces mounted on motion elements such as the wheels. Similarly, the devices may read off the ground or other surfaces over which or by which the bicycle moves. The means for measuring the position, velocity and acceleration vectors are preferably associated with the crank shaft assembly so as to measure force delivery to the crank shaft from force applied to the pedals. The position, velocity and acceleration measurements may be made in association with one of the wheels or the ground or other fixed location which the bicycle moves relative to. In a preferred embodiment, the position, velocity and acceleration measurements are made for each pedal more often than once per complete rotation of the crank shaft and, more preferably, once for each application of a force. An example of an application of force is the pushing on a pedal during a downstroke using the rider's body mass weight and muscle pull or push for force engagement. The measurements made in association with a wheel should account for dead or reduced force effects when the crank shaft rotation and the wheel rotation are occurring at differing rotational velocities either intentionally as a strategy of the rider or inadvertently from performance inefficiencies. Synchronization with a digital camera is an optionally embodied feature in which data acquisition for position, velocity and acceleration measurements can be synchronized with visual data recording.

FIG. 1 shows positioning error as a function of points per revolution for a 20 inch diameter bicycle wheel. As shown in the figure, even with 100 points/revolution, the error is still over 0.5 inches. But as the points/revolution enters the domain of an optical encoder system (1000 points per revolution or more), the error reduces to more acceptable levels. Using dual quadrature to measure both edges of a single line, an encoder with 1000 lines/revolution will produce 4000 data point per revolution, reducing position error to 0.016 inches or 1/64th of an inch as denoted in the figure. In short, any system with 100 data points (or less) per revolution would need some means of determining a starting point in order to determine position with any degree of accuracy. Subsequent data points can be interpolated with varying degrees of success depending on the shape of the signal being measured. One way to do this would be to purposely position the wheel as to trip a sensor on the start. However, under normal operating conditions this would be cumbersome, as riders frequently need to "hop" and rotate their back wheels while balancing on the gate in order to make slight adjustments in pedal position.

Accordingly, another embodiment of the present invention is the above invention in which the sensitivity is effective to determine accurate position assessment from a starting point, preferably within less than one wheel revolution, more preferably within about one foot, even more preferably within about ±one inch, and still more preferably within ±one-sixty fourth of an inch.

Figure 2:
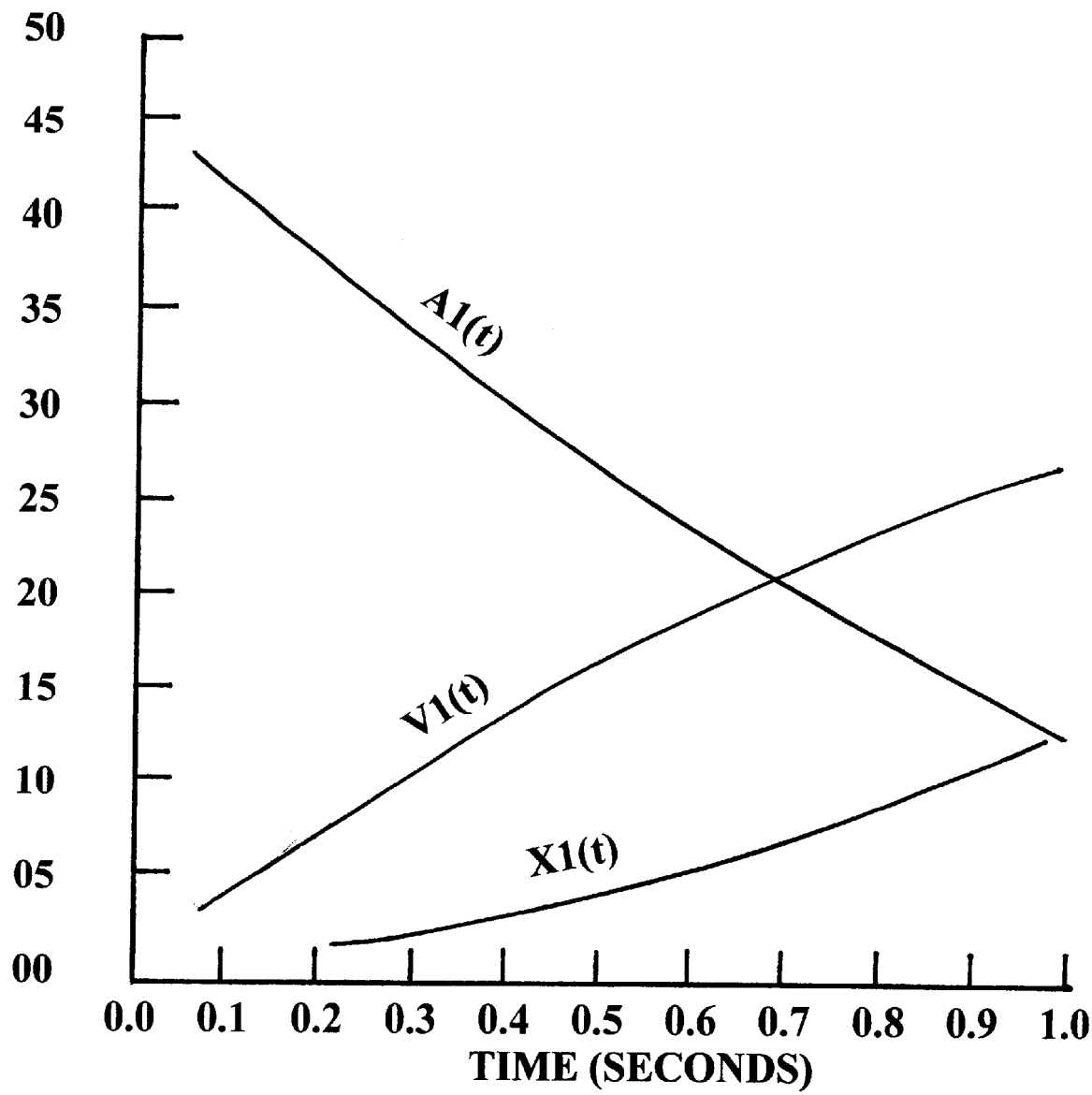
FIGS. 2 and 3 depict curves to simulate performance using basic starting curves with and without sine wave behavior.
Figure 3:
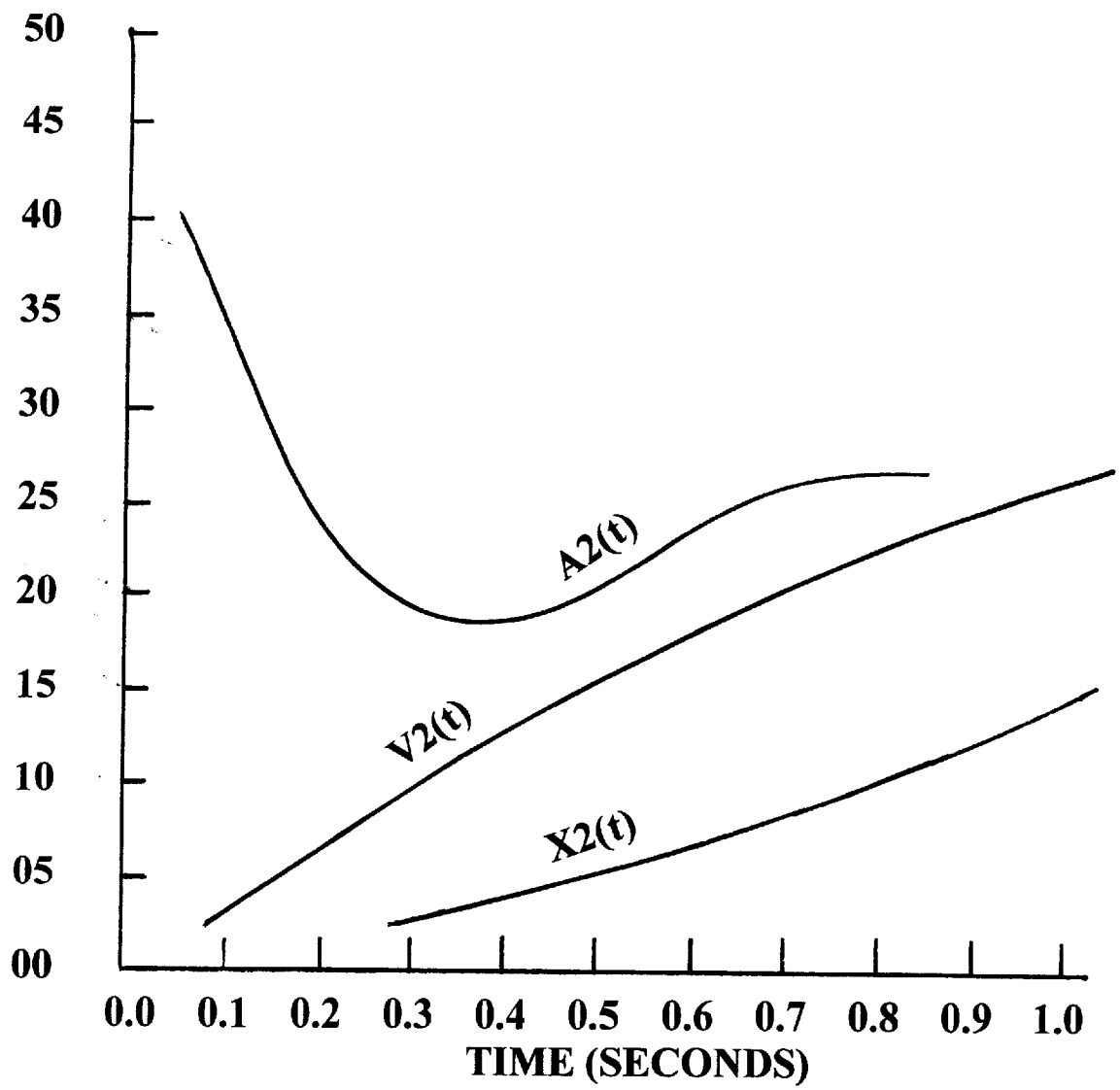
Figure 4:
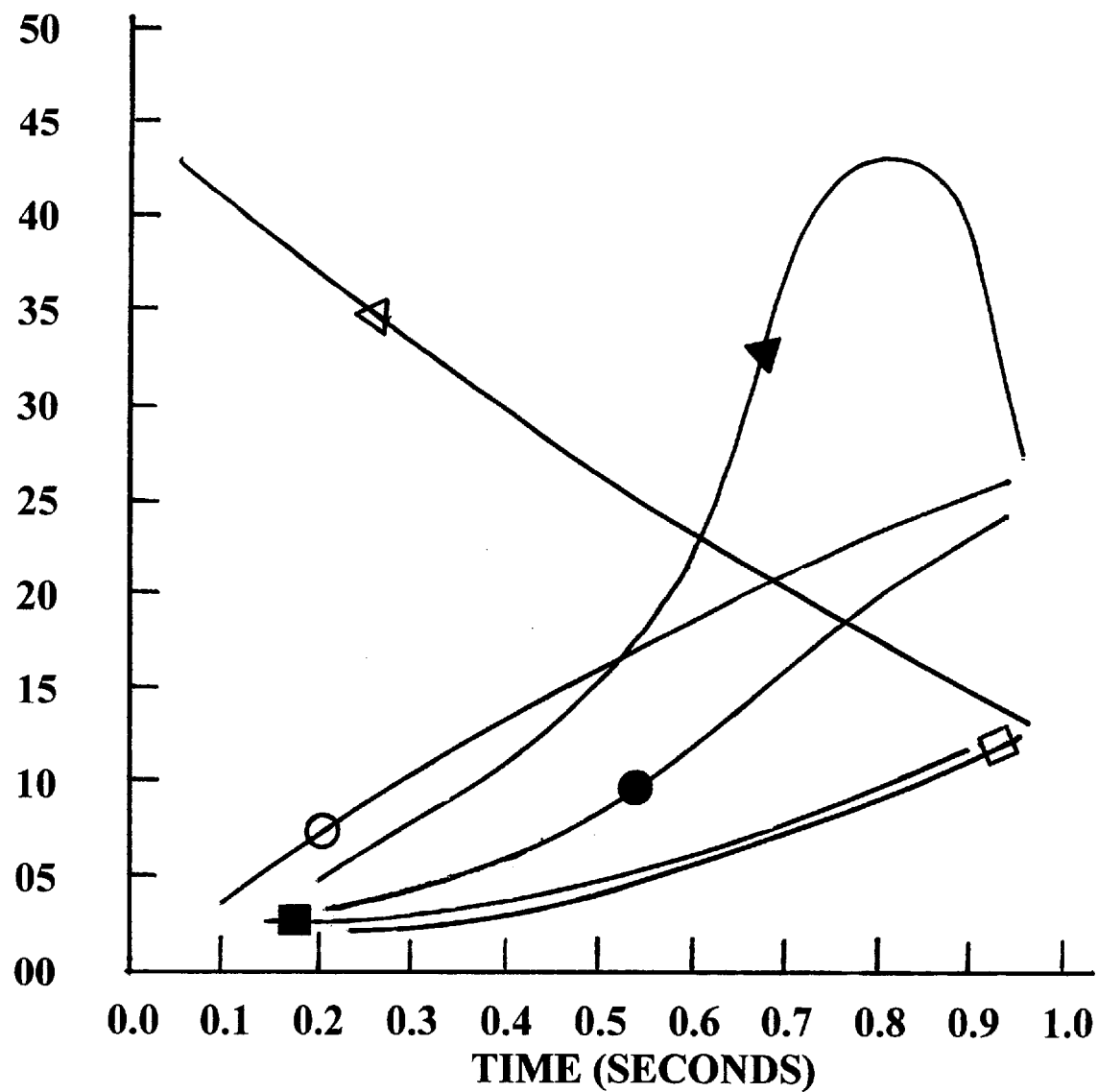
FIGS. 4 through 7 depicts position, velocity and acceleration curves using various data points per revolution of wheel.
Figure 5:
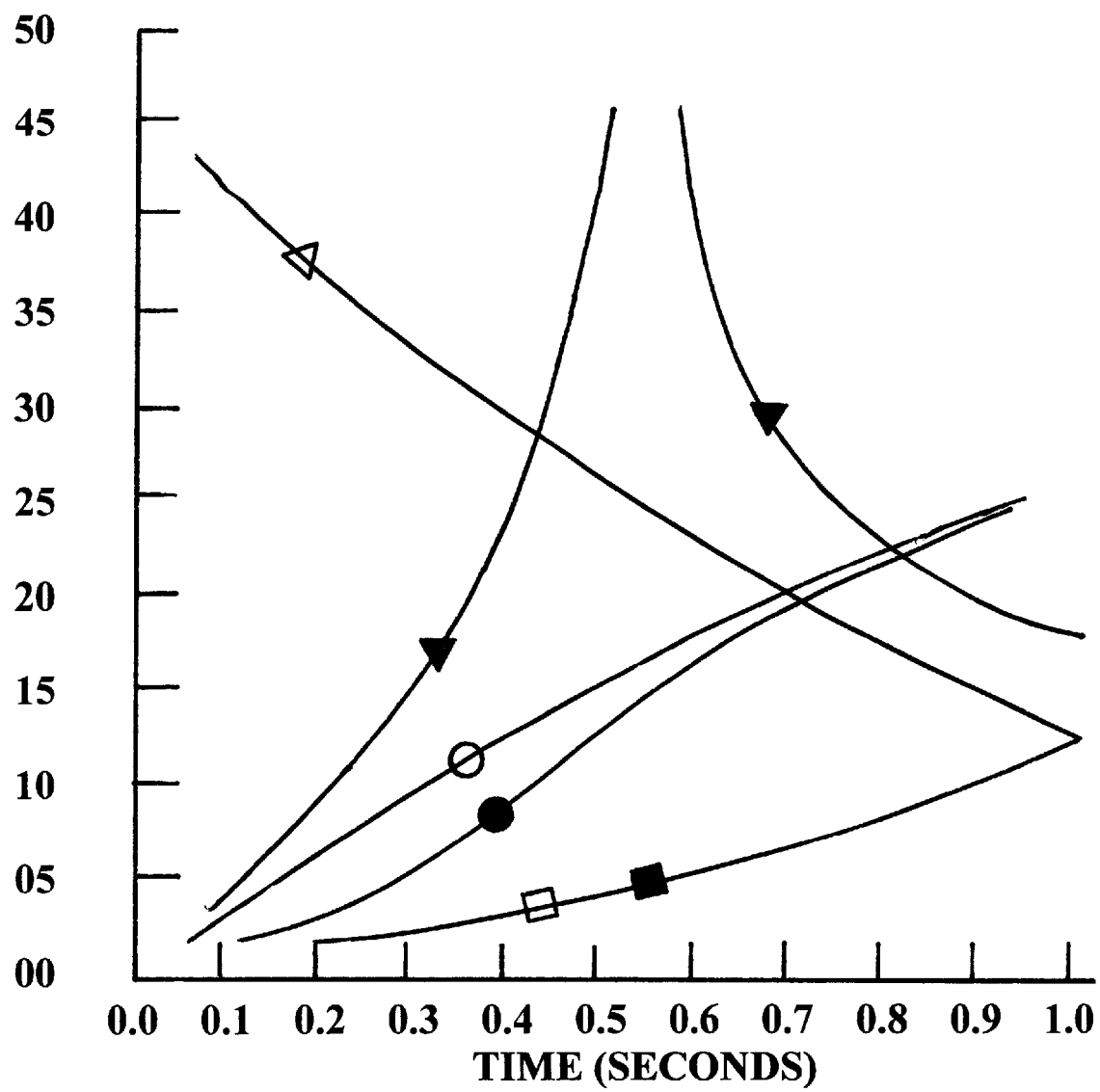

The number of data points per wheel revolution affects the accuracy with which position, velocity, and acceleration can be measured. Two examples are shown below. The curves used for these examples are shown in FIGS. 2 and 3. In the first example, position curve "x1" represents a basic curve indicative of efficient starting performance. The performance can be evaluated using the shape of the acceleration curve. Ideally, the acceleration would be maximal at the initiation of the start and decrease smoothly to a zero value at maximum speed. Any intermittent accelerations followed by decelerations prior to maximum speed would be indicative of bad form, characterized by a rider's inability to get the body weight to the back of the bike after the first pedal and keep it there while sprinting. The second example, curve "x2," has a slight sine wave to simulate this phenomenon. Of course, other factors, such as weak pedal strokes, could also contribute to poor performance. This example is just one possible scenario.

FIGS. 4 through 7 show the position, velocity, and acceleration curves that would be captured on curve "x1" using 1, 2, 4, and 8 data points per wheel revolution, respectively. As shown in the figure, spurious velocity and acceleration values are noticeable even with 8 points per wheel revolution. The accuracy of the system improves at higher wheel speeds because the sampling rate effectively increases with wheel speed. Unfortunately, this does not make up for the fact that important information is missed at the beginning of the effort that is needed for comparison with the rest of the curve. In addition to the spurious velocity and acceleration values, note that the position error due to interpolation at one point/revolution can be quite significant, reaching 1.08 feet or 13 inches at time=0.25 seconds.

Even at higher speeds (20–30 Mph) at which the wheel makes one revolution every 0.13 seconds, the one point per revolution acquisition rate is not reasonably sufficient for most applications after the start. For example, a rider at full speed approaching a "rhythm section" of 2 feet high roller bumps spaced 5 or 6 feet apart may want to observe speed gains or losses due to "pumping" over each and every bump in the series. The fine resolution obtainable of at least about 64 points/revolution, more preferably about 256 points/revolution, even more preferably 1000–4000 points/revolution, would be needed to pinpoint a riders position within the series of bumps and provide useful feedback. Another example of the need for this resolution are the wheel speed gains/losses that need to be captured to indicate jump takeoffs and landings so that data can be related back to racetrack position. A rider needs to perform studies to determine the duration and magnitude of these types of signals as well as the appropriate acquisition rates with which to capture them.

FIGS. 8 through 11 show the position, velocity, and acceleration curves that would be captured on curve "x2" using 1, 2, 4, and 8 data points per wheel revolution, respectively. Again, spurious velocity and acceleration values are noticeable at all levels, with accuracy improving in each graph at higher wheel speeds.

In both examples above, even a system with 8 points per wheel revolution would still not be able to accurately capture the velocity and acceleration profiles needed to assess start performance. For example, an encoder system with 4000 data points per revolution would be capable of reproducing all of the curves shown above with a high degree of accuracy. Other systems are useable of course.

EXAMPLES

This example illustrates the resolution required to measure performance of a starting gate effort. This example uses a gage distance of 18 feet from the starting gate. The 18 feet gage length was selected to correspond to the first three down strokes of the pedals, which is the period in which one would assess gate-specific performance. In this distance a rider will perform a two-stage starting motion. The first stage is throwing the rider's weight forward so as to touch their hips to the handlebars, and then returning back to a normal sprinting position in which the rider will be standing, leaning back, and pulling on the handlebars. The starting motion is initiated a fraction of a second before the gate drops. (Before the start, the rider is balanced with both feet on the pedals, leaning back, crank position level with the ground.) The starting motion is so forceful that it causes the bike to initially recoil backwards about 4 inches. The recoil also allows the front wheel to float a few inches above the top of the starting gate as the gate falls. All of this motion involving the first three down strokes, from initiation to "steady state" sprinting form, takes place in about 1 second.

Experimental starting gate time data is taken over an 18 feet gage length for two individual efforts. The respective values are 1.076 and 1.056 seconds. This data is taken using two reflective beam transducers connected to a timing relay with a ±0.001 second resolution. Both efforts are recorded on videotape for additional analysis. The efforts vary by only 0.020 seconds. (Subsequent video analysis of both efforts revealed that a slight fluctuation of the upper body movement contributed to the slower time). Data collected over several practice sessions indicate that the difference between the two values is significant, as data sets have been obtained for practice sessions where the values for a single rider were repeatable within 0.004 seconds. The calculated position versus time curves indicate that the position difference between the two runs at t=1.056 seconds is approximately 4 inches or 6% of a complete wheel revolution. In a race situation, 4 inches is enough room for a faster starter to place an elbow in front of a slower starter and block. Actual race conditions have shown that an entire gate of pro riders can be grouped within a 4 inch envelope for a good portion of the first straight.

Accordingly, a useful measurement system for assessing BMX racing performance would need to be able to calculate position within fractions of an inch and resolve time on the order of one thousandth of a second, either by direct measurement or by interpolation. Ultimately, the system would need to be able record this information over any desired portion of the racetrack.

Use of Conventional Systems

Consider attempting to use a conventional cycling computer (linked to an acquisition system) to measure starting performance as described in the previous example. In 18 feet, a 20 inch diameter wheel would complete 3.44 revolutions. The crank set, assuming a typical gear ratio of 44 teeth front sprocket to 16 teeth rear sprocket, would complete 1.25 revolutions. This would provide only 3 data points at the wheel and 1 data point at the crank set. This system clearly could not be used to discern a 4 inch or 0.020 second difference between two individual starting efforts with such rough sampling, yet alone facilitate further analysis of crank strokes.

An interpolation algorithm is used to estimate the values between the data points (which would only make reasonable approximations on smooth curves). The wheel has no reference point to establish a "zero" position. The magnet would have to be strategically placed at the sensor for every start, and even then the system fails to record accurately because the magnet system does not provide directional capability (recall that the bike recoils backwards at the start).

Use of Present Inventive System

A system embodying the present invention is used and consists of two digital pulse encoders, one on the rear wheel, and one on the crank arm. These units output rotational position data to an on-board data acquisition computer. The computer records the pulses with a time stamp at an appropriate sampling frequency. The resultant data file is then inputted into a computer program that calculates velocity, acceleration, and enables the user to compare various aspects of the measured efforts. The system uses a rotational measurement device, digital or analog, that is capable of measuring rotation within a few degrees or less. Other optional devices can be used which include any method of collecting detailed position data that serves the purposes described herein. The data could also be collected and/or sent using a telemetry system.

One manufacturer of suitable rotary encoders and data acquisition units for these purposes is U.S. Digital Corporation. A system of U.S. Digital "E3" encoders and a "USB1" data acquisition were obtained for experimentation. The E3 encoders have 1000 lines per revolution, which, using dual quadrature, output 4000 pulses (positions 0 through 3999) per revolution. This provides a resolution of 0.090 degrees per pulse or an overall bicycle position resolution of about 1/64th of an inch assuming a 20 inch diameter wheel.

A conventional cycling computer is used to obtain the maximum velocity for several sprints of incrementally increased length were used to approximate the shape of a velocity profile from a standing position. Using this information, along with the data from the reflective beam timing experiment explained above, the following position, velocity, and acceleration equations are derived:

Position: $x(t)=44t+44e^{(-t)}-44$

Velocity: $v(t)=44-44e^{(-t)}$

Figure 12:
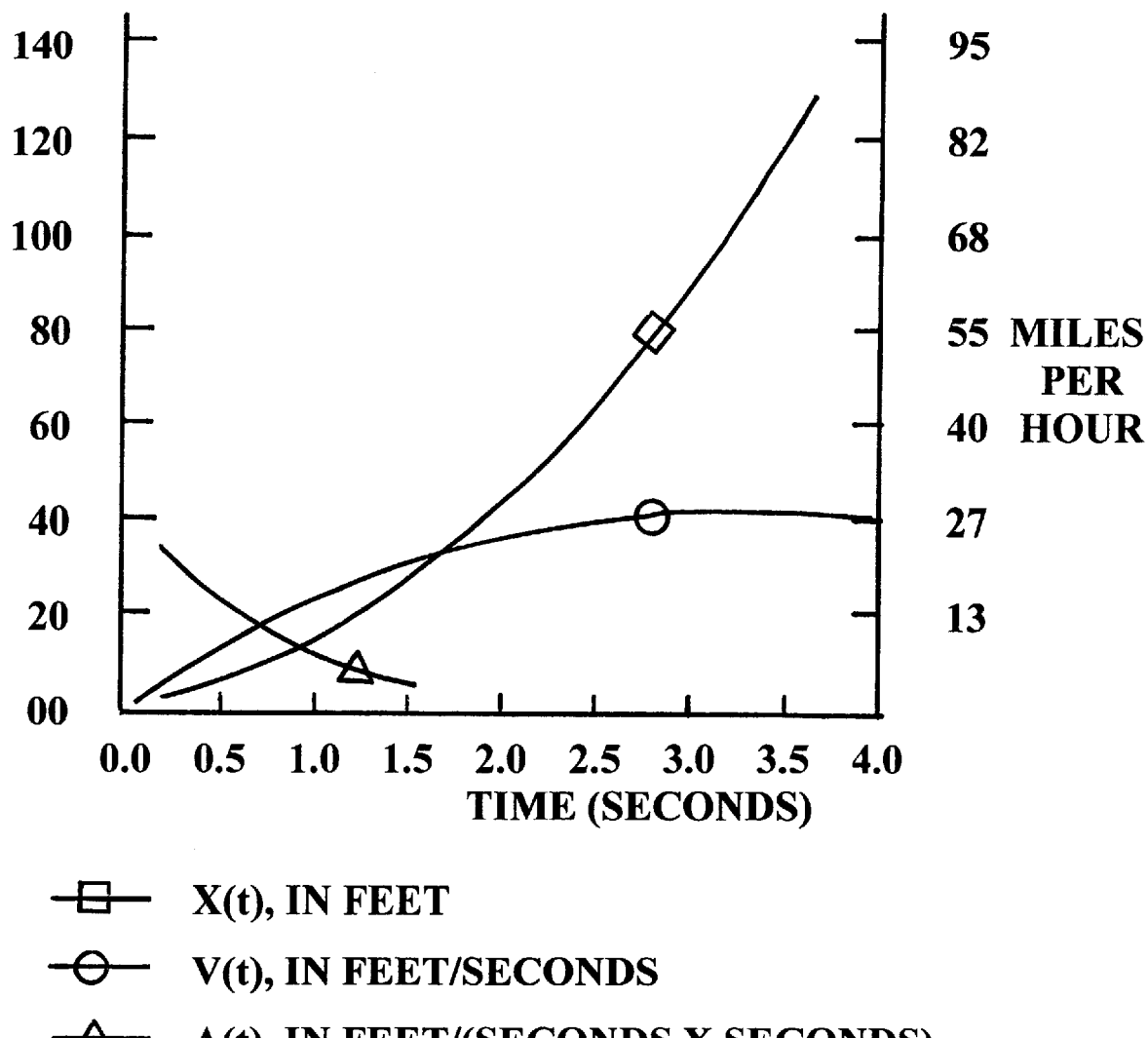
FIG. 12 depicts calculated position, velocity and acceleration equations on an exemplary apparatus.

Acceleration: $a(t)=44e^{(-t)}$ wherein "x" is a distance measurement in terms of inches, "v" is a velocity measurement in terms of inches per second, "a" is an acceleration measurement in terms of inches per second squared, "t" is a time measurement in terms of seconds, and "e" is the mathematical exponential value. These equations are plotted in FIG. 12. (These curves do not include the initial recoil that would can be present in a start effort). The continuous curves are digitized by back-calculating the pulses in term of real values and then discarding the fractional portion. The digital representation of x(t) is easily differentiable into v(t) and a(t) using high-accuracy finite-divided difference formulas. The data in this example is simulated to represent 100 Hz. The UBS1 unit is capable of 1000 Hz.

The error associated with using the finite divided difference formulas is minimal and is proportional to the 4th power of the sampling frequency. A piecewise, low-order polynomial fit can be performed in a software to filter out digital noise that may allow anomalous values to show up in the acceleration calculations. The functions above, along with variations to simulate various efforts, will be used in the following examples.

Additional Demonstration of Intended Use—

The following Examples Illustrate the System and Exemplifies Use for Training

Presume as an example that a bicycle ride's best time to a given position, say 60 feet from the gate, is described by x1(t)=x(t) (above). At x(t)=60 feet, t=2.26 seconds. The next effort outperforms the previous curve such that the new curve: x2(t) is 0.030 seconds faster, reaching x2(t)=60 feet at 2.23 seconds. Assume that the second effort has an improved start, but then, halfway through the effort, the acceleration is no different than that of the first effort such that:

| | | |
|---|---|---|
| First Effort: | x1(t) = x(t) | 0 ≦ t ≦ 4 seconds |
| Second Effort: | x2(t) = x1(t) + (0.02 * x1(t)) | 0 ≦ t ≦ 2.51 seconds |
| | x2(t) = x1(t) + 1.392 | t > 2.51 seconds |

Figure 13A:
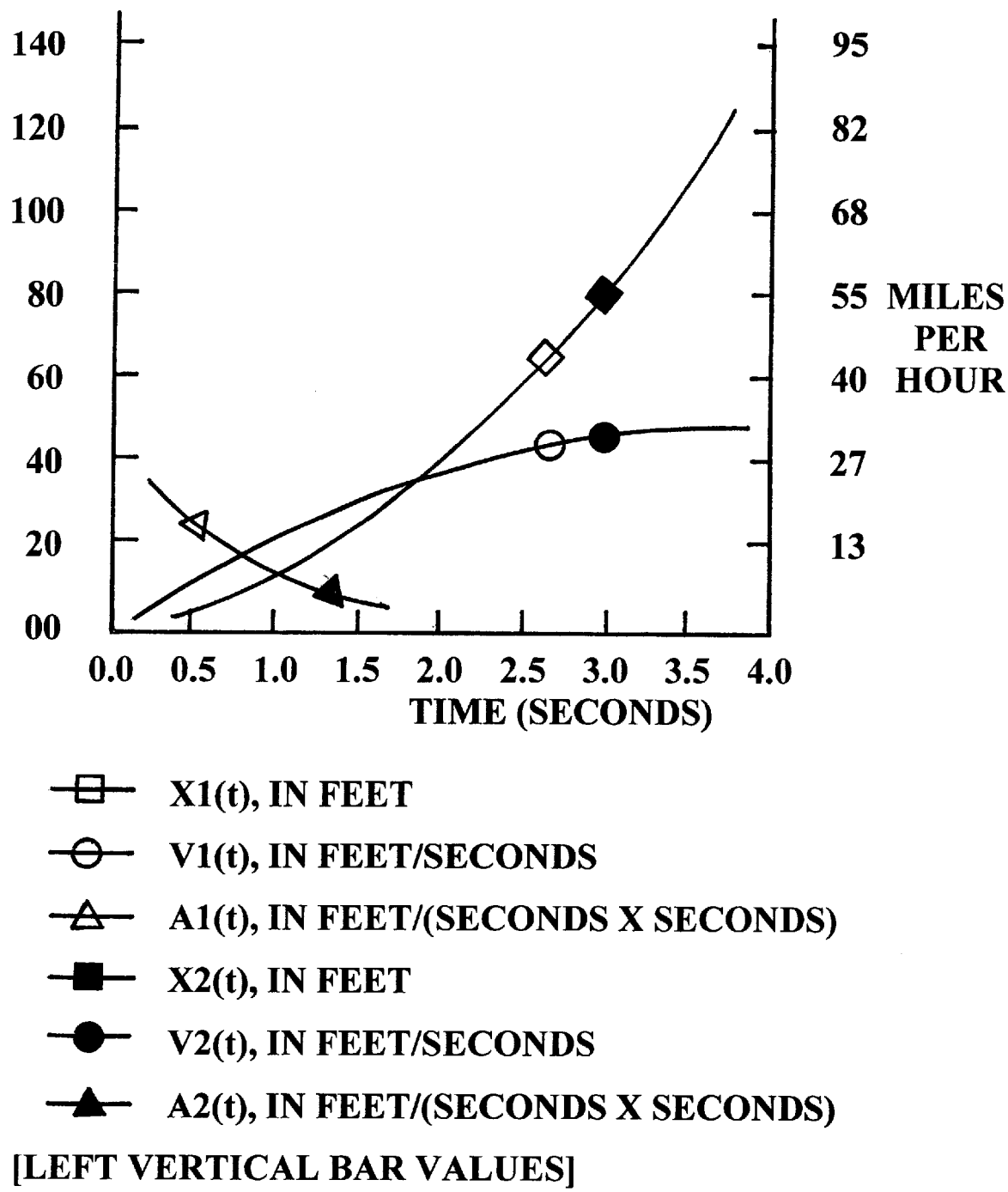
FIG. 13 depicts a demonstration of intended use of the present invention.
Figure 13B:
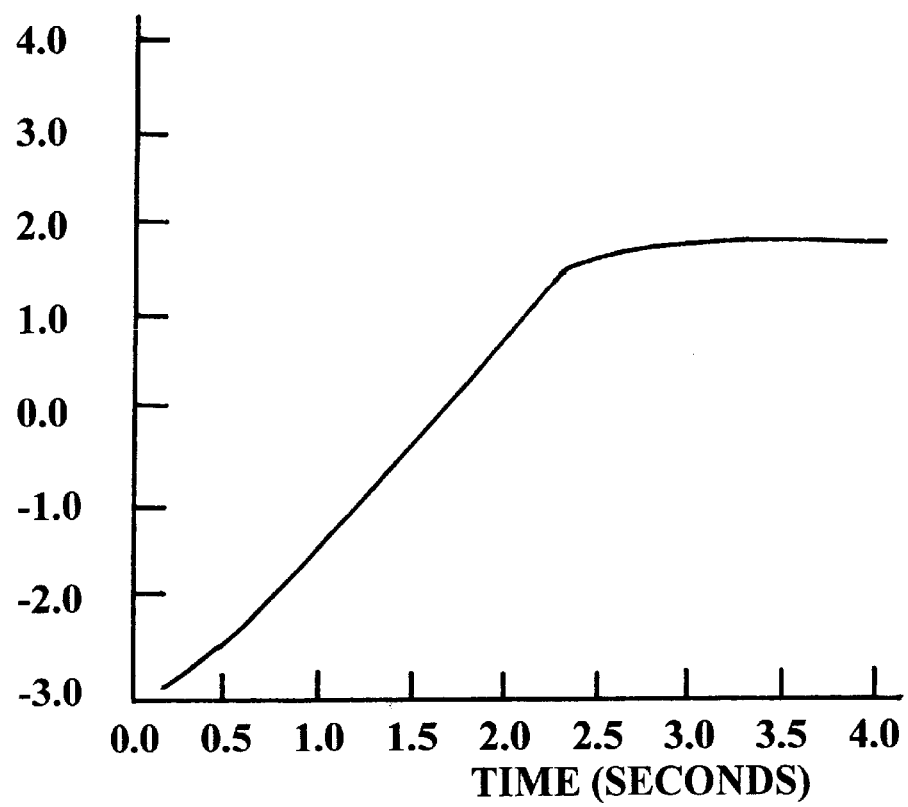
Figure 13:
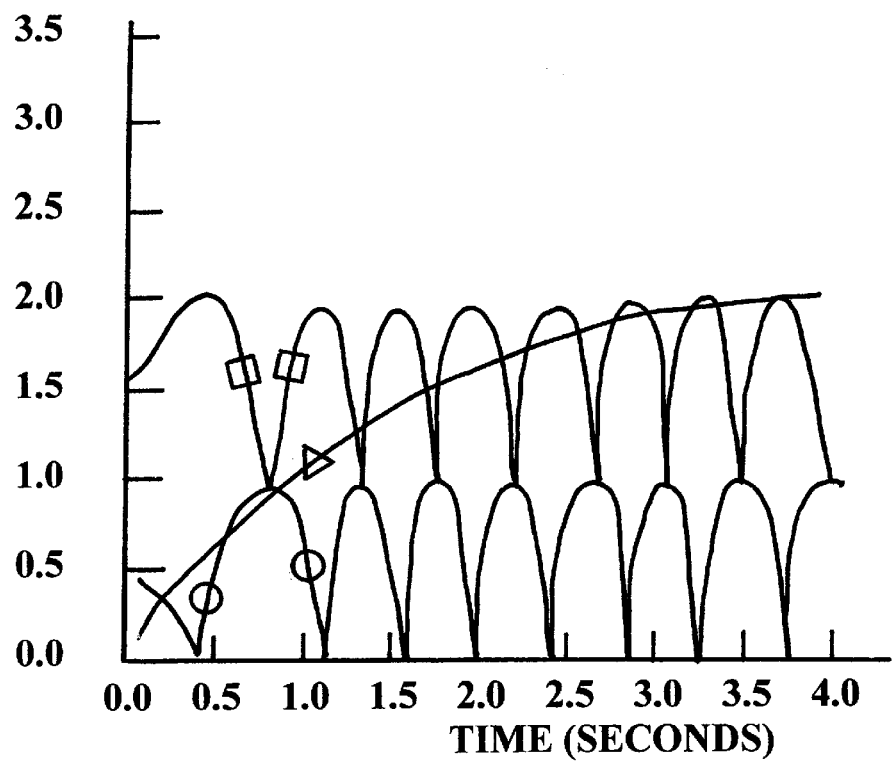

The data that result from these two efforts are plotted in FIG. 13(a). Also plotted are the corresponding velocity and acceleration traces (the spike at t=2.51 seconds is a result of the sharp numerical discontinuity at t=2.51). When plotted in this fashion the two curves are barely discernable, although the difference would be very discernable on the racetrack. FIG. 13(b) shows the relative difference between the two curves in feet. As shown in the figure, the second effort "pulls away" steadily from the first effort until they run at the same velocity. FIG. 13(c) shows the crank position and revolutions per minutes as a cycloid function in time. The red curve shows the right pedal position, while the blue curve shows the left. While is it obvious that the pedals must always be 180 degrees from each other, displaying a curve for each pedal makes it easier to follow, as BMXers typically train in terms of half cranks, or down strokes, of the pedals.

The plots shown in FIG. 13(a)–(c), viewed together as shown in the figure, provide valuable training feedback. In this example, a rider can tell that the first ten pedal strokes of the second effort were faster than the first, and that the last portion of the sprint is not improved, suggesting that maximum RPM is reached. By simultaneously viewing the plots in FIGS. 13(b) and (c), a rider can pinpoint any portion of the start using the crank position feedback. Under real conditions, attention can be focused to the transition crank strokes: 1–3 crank strokes for the start, 4–6 crank strokes for the transition to full sprint, and 6–10 crank strokes for top end before the first jump.

In another embodiment the cycloid curve indicates whether the crank speed matches the wheel speed. This is performed by dividing the number of teeth on the front sprocket by the number of teeth on the rear sprocket and using the ratio as a speed match criterion plus or minus an experimentally determined tolerance factor to allow for chain stretch. Spots where the crank/wheel speed does not match would indicate "dead spots" in the pedal stroke in need of improvement. Although conventional knowledge would attempt to use power measurement for this purpose, it is noted that in BMX, each of the first three down strokes is a different entity executed with changing form, and not easily compared with the previous/next crank revolution as would be appropriate for a sprint already in full motion.

Figure 14A:
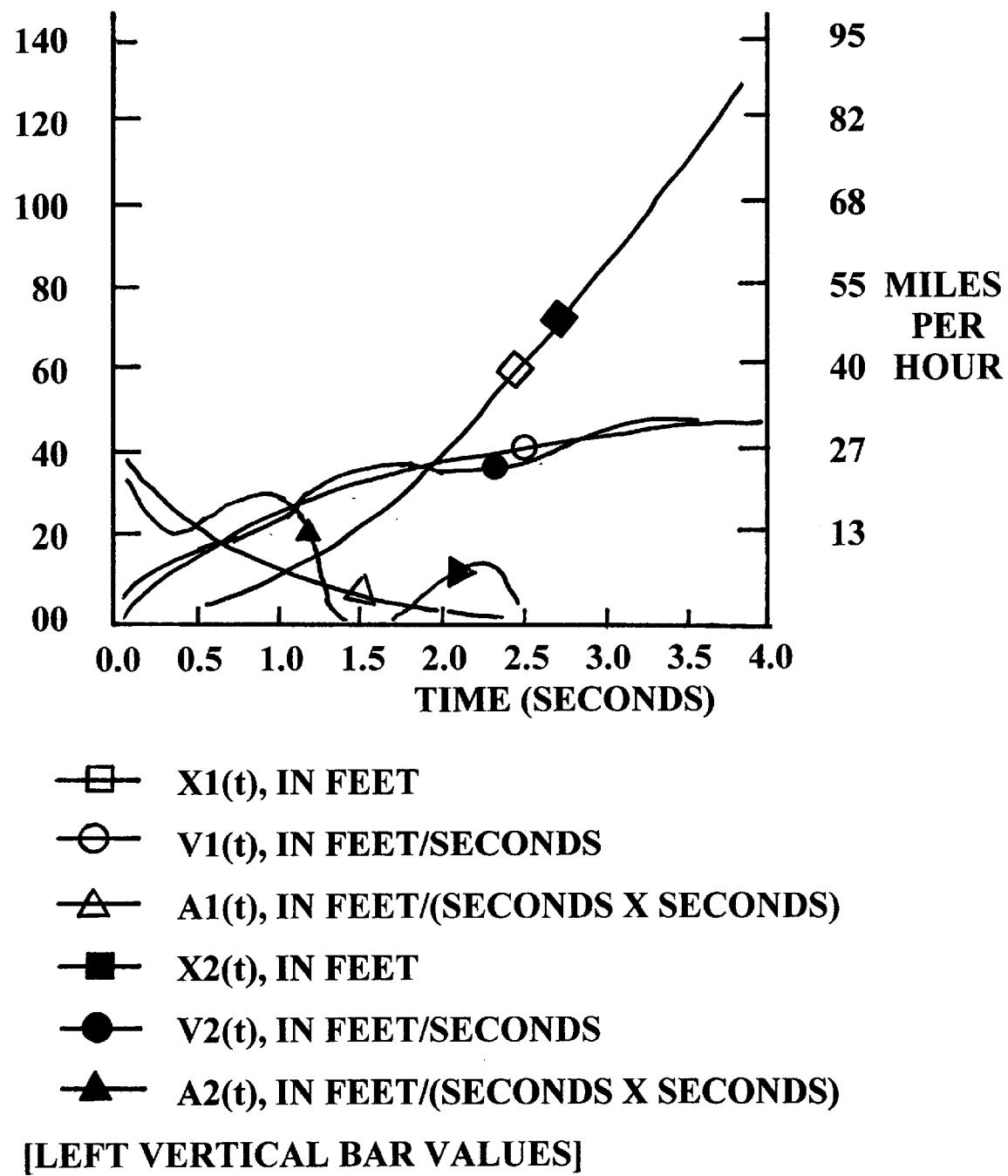
FIG. 14 depicts a demonstration of intended use of the present invention.
Figure 14B:
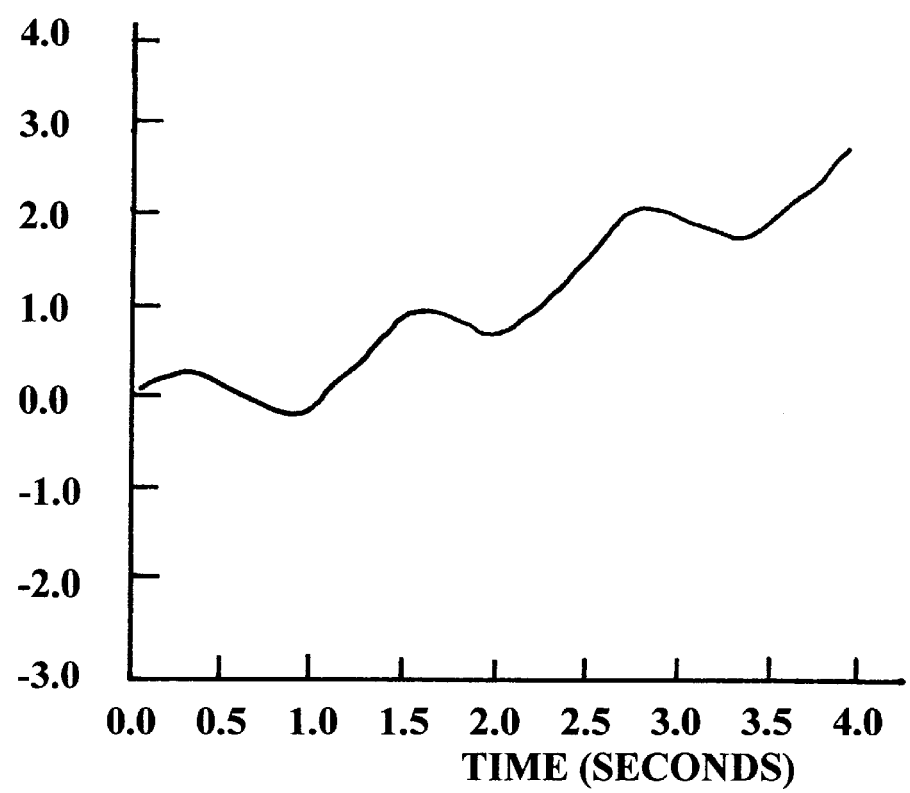
Figure 14:
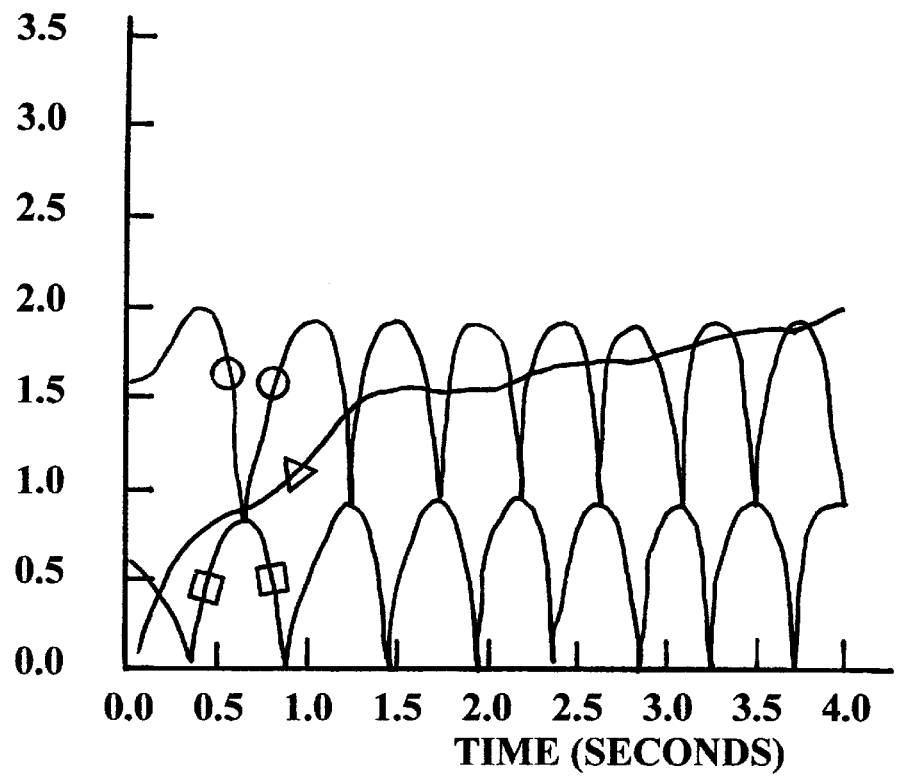

Another example is depicted in FIG. 14(a)–(b). In this example, a sine wave is added to the second effort to simulate the "head bobbing" effect of a rider with inefficient form executed between the first down stroke (hips forward) and second down stroke (hips return). As in the previous example, the differences in the position curves are barely discernable to the eye in raw form, and are better observed in (b). However, the wavy shape of the acceleration curve in (a) would clearly indicate presence of the inefficiency. The sine wave is superimposed over the entire curve in this example, whereas it would probably not be so pronounced past the 4th or 5th down stroke in a real situation. Nonetheless, it is important to note that acceleration/decelerations of the type shown in FIG. 14 could only be recorded with a system that has the resolution and sampling frequency as embodied by the present invention. These fluctuations could not be reliably recorded with conventional systems. It should also be noted that the time values calculated by sampling at 100 Hz could be interpolated to values at 0.001 second intervals with considerable accuracy for this particular signal, whereas interpolation of 0.010 second intervals from 10 Hz "data" could not be performed accurately.

Feedback from use of the present invention enables a rider to improve performance by identifying problem areas. With such feedback, big improvements in technique can be attained over the period of a single practice session of repeated efforts. For example, the simple reflective beam timing system can be used to measure starts as outlined above. By taking notes on what was physically experienced for each effort and iteratively experimenting with various techniques, a multitude of variables can be identified and optimized: the hand position on the grips, the amount of tension in the arms while balancing on the gate, the degree of head angle on the forward thrust, and the like. Further multitudes of improvements are enabled by use of an on-board data acquisition device.

Other Uses Exemplified

The examples discussed above applied only to start performance. The ability to analyze starts is only part of the data acquisition system's usefulness. Another application involves the measurement of performance over various obstacles. Take, for example, a single speed bump as is typically encountered at the bottom of a starting hill. Using the crank feedback as a marker, a rider can pedal slowly up to the base of the obstacle from a fixed starting point, stop pedaling over the obstacle, and then resume again. The resultant pedal trace would provide a "marker" as to where the obstacle is positioned. Full speed efforts can then be repeatedly performed from a fixed starting point, and the rider can then review the data to determine if they are losing, holding, or gaining speed over the obstacle.

The same concept can even be applied to jumps where riders leave the ground. Research will be performed to determine how to "read" velocity/acceleration data as to ascertain when a rider takes off or lands. The slowing/speeding of the wheel that intuitively occurs upon landing/takeoff will be used as markers with which to compare data. While not as accurate as the on-ground data described above, meaningful results could still be determined. Take, for example, a "rhythm" section of consecutive double jumps. The intuitively cyclical velocity pattern could be used to determine if a rider is gaining or losing speed over each jump. In this capacity, the magnitude of the velocity/acceleration curves would provide the measurement whereas the shape of the curves (peaks and valleys) would be used to discern "position" through the obstacles.

Another application, similar to the measurement of start data, is measuring acceleration out of corners of a track. Using pedal movement as a marker, data can be related back to racetrack position. Some riders execute techniques to "pump" banked corners by pressing on the outside crank arm in the down position at the corner apex. The present invention is able to analyze the effect of these movements on velocity and acceleration.

Figure 6:
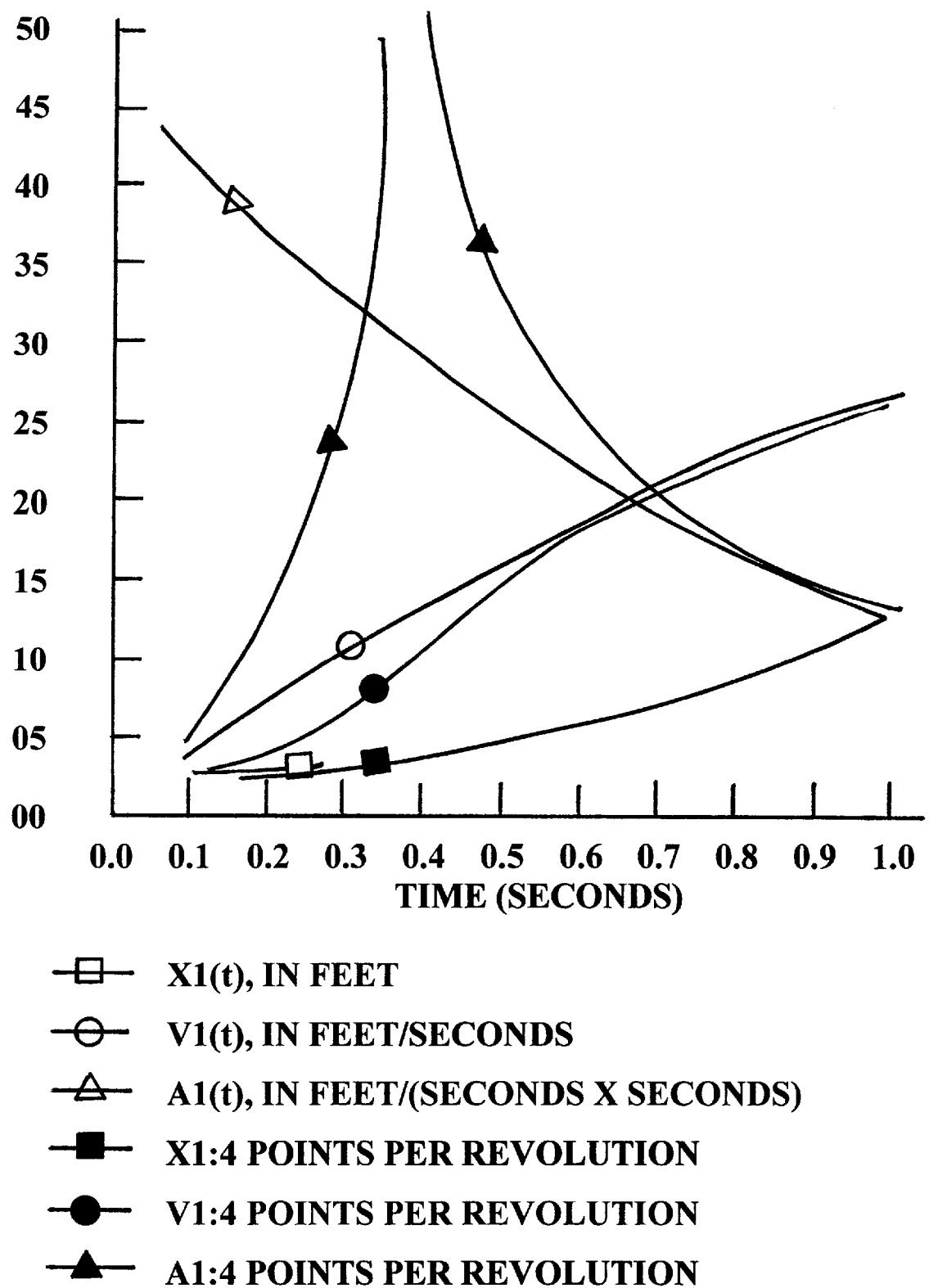
Figure 7:
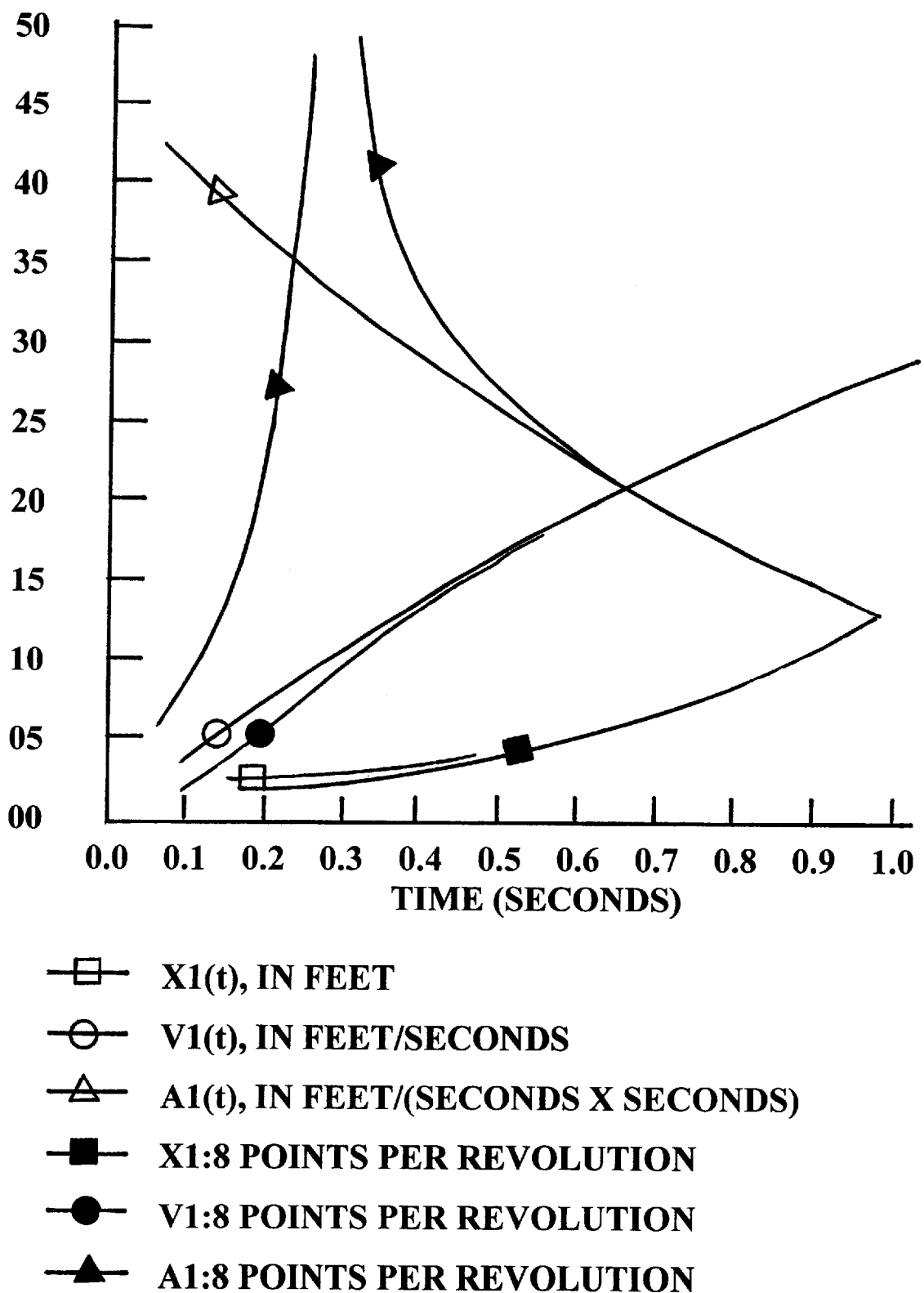
Figure 8:
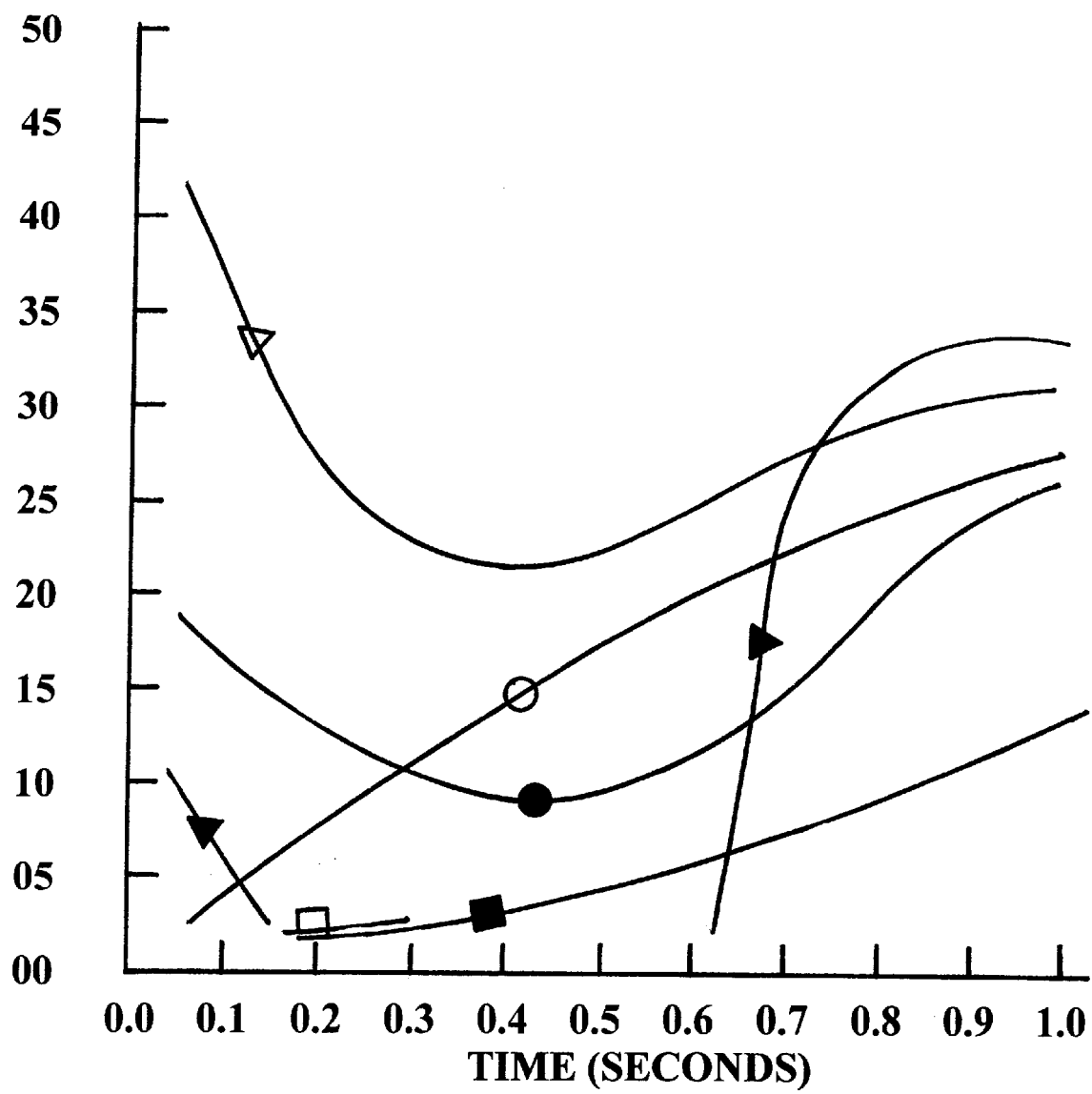
FIGS. 8 through 11 depicts position, velocity and acceleration curves using various data points per revolution of wheel.
Figure 9:
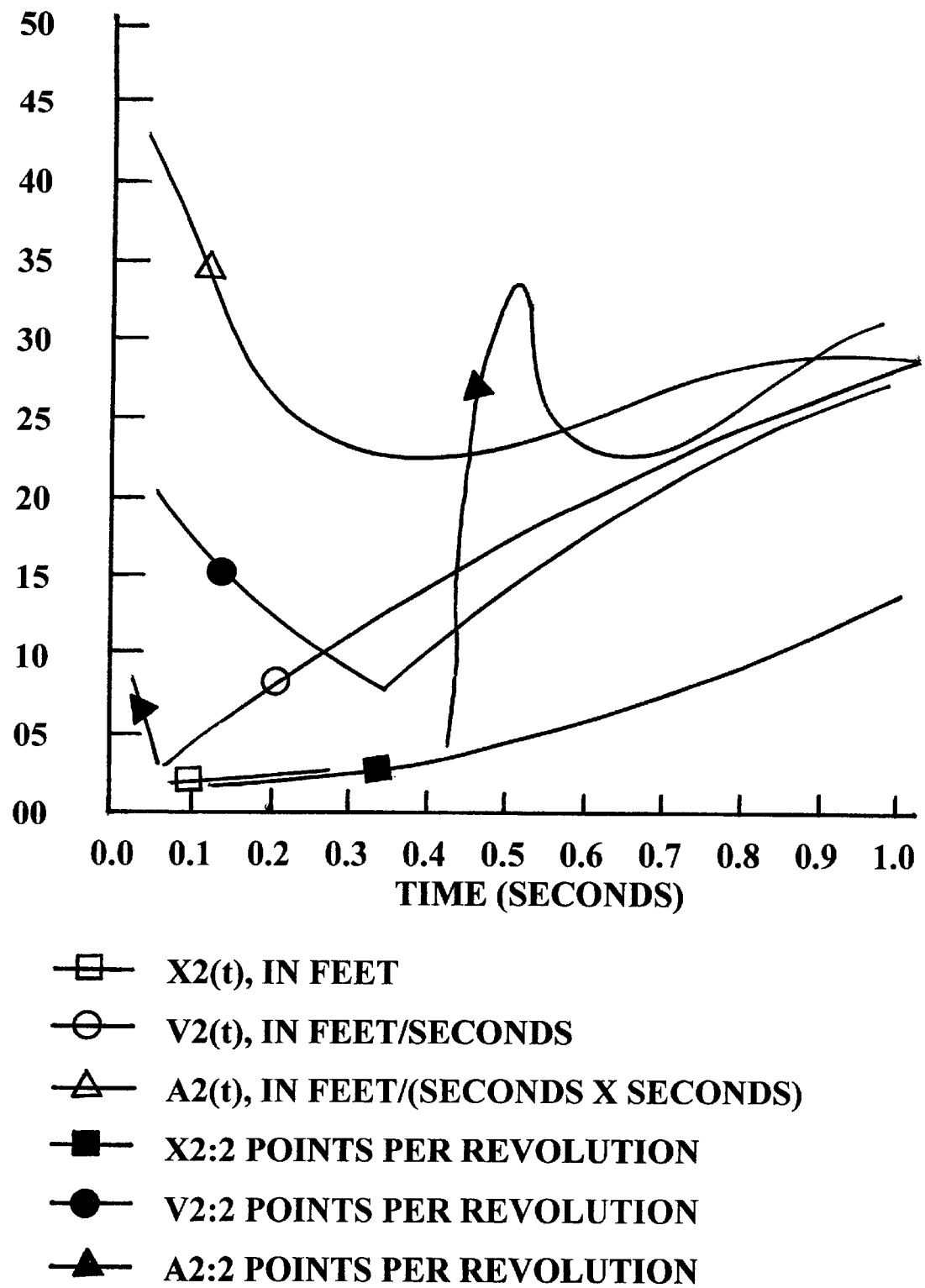
Figure 10:
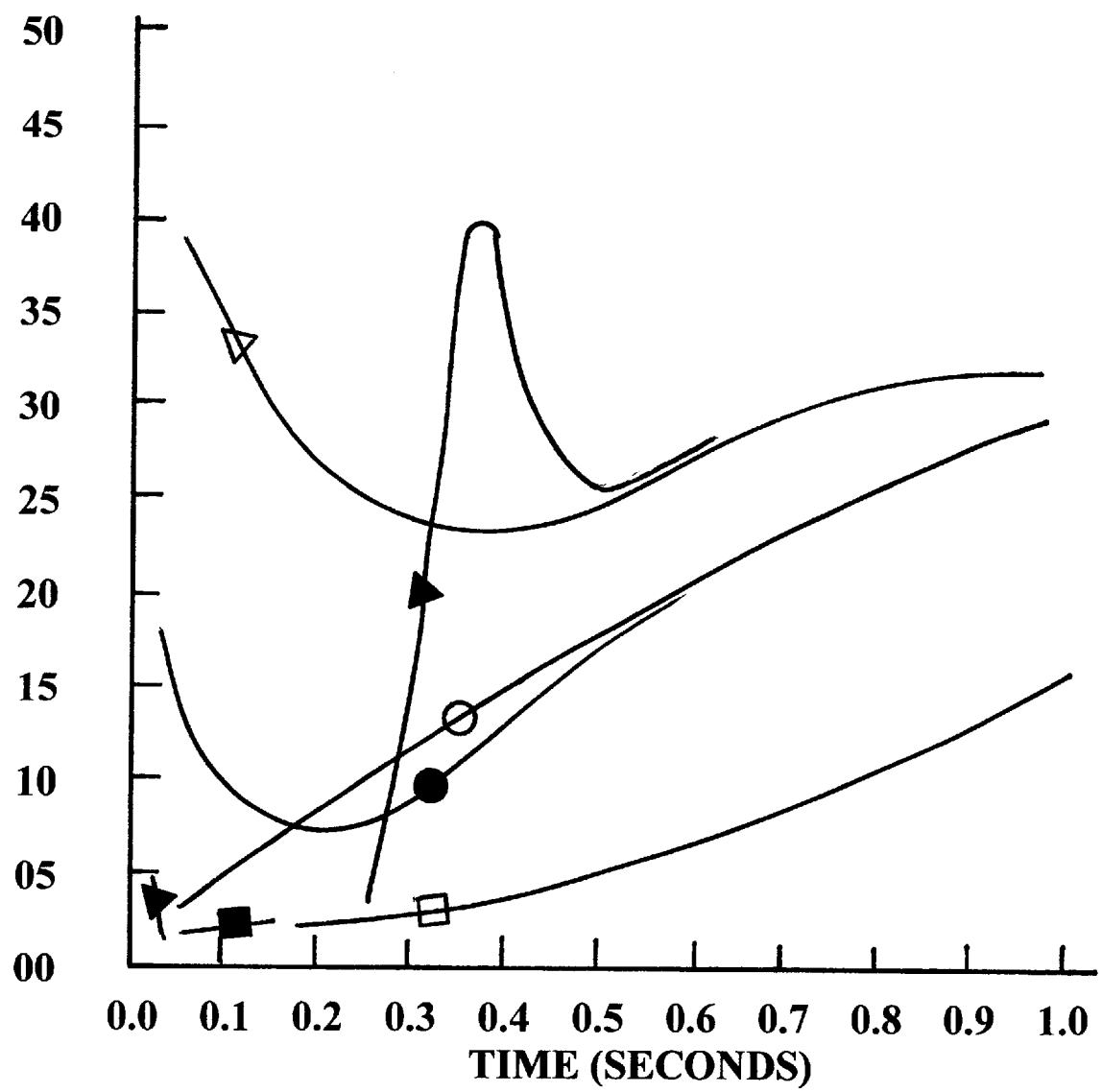
Figure 11:
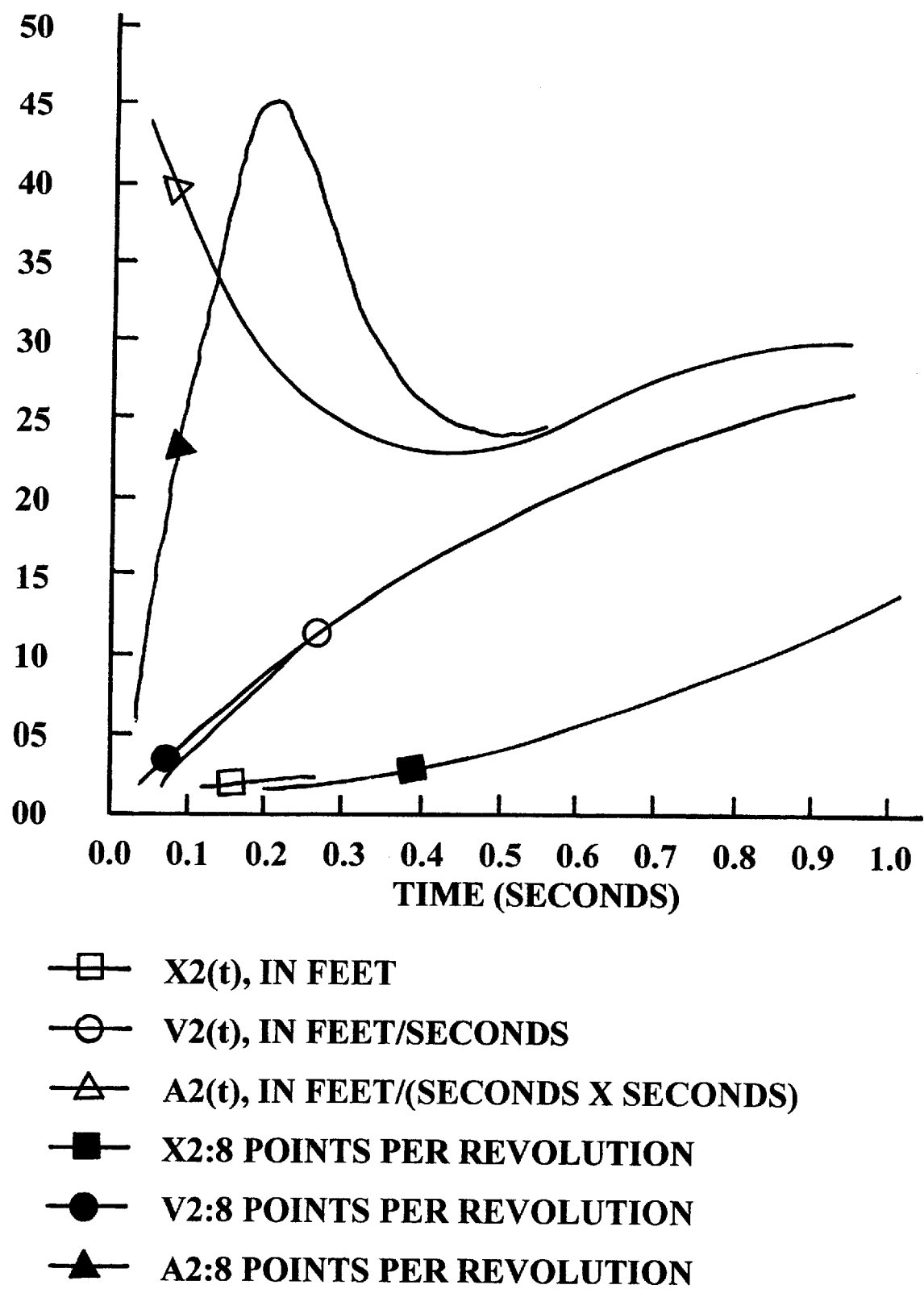

The software useable with the present invention can provide depiction on screen of the three plots shown in FIGS. 6 and 7. The first screen can be used to load the data and verify its receipt, possibly by showing the last imported effort in a different color and assigning it a new number. Each plot can be accompanied by "buttons" to select which curves (velocity, acceleration, etc) are to be viewed. Several race efforts can be displayed at once for convenient comparison. An array of "buttons" on the side of the plots can enable the user to select which runs are to be plotted simultaneously for each graph. For instance, one curve can be selected as a "reference" curve, or "best effort so far." The other curves can be compared in the second graph. For instance, in FIG. 13(b) the reference curve is x1(t), so the plot shows x2(t)–x1(t).

The program can also tie into a database that will make it easier to manage data. For example, a rider may want to search for a curve that represents the fastest three pedals, or the fastest time to 60 feet., or even use the data from another rider with which to compare. Optionally, a text input box can be added to the bottom of the main screen to input rider feedback, so that the text can be saved with the data file being imported. Comments such as "felt off balance", "felt choppy on the third crank", "tried a looser grip", or "can't figure out slow time, check videotape later" can be input for future reference.

The use of the basic system has been described above. One option is the use of body-mounted accelerometers. In a start, for example, slight movements of the head and neck during the thrust of the first two pedal strokes can have a marked effect on acceleration. The issue of upper body movement is also a major factor for conserving momentum over a jump. For example, if a riders allows himself to get "bucked" forward slightly over a speed bump, the entire system (bicycle+rider) loses speed. Of course, the end effect of such upper body movement on a rider's speed would be recorded by the system as described above, regardless of the body movement. But by combining the data of the basic system with data from transducers on the body (or even additional transducers on the bike, such as tilt meters), a more complete characterization of performance can be obtained. Even transducers to measure muscle contraction, placed at various point on the body, can be used as part of the system. It is noted that signals from transducers, such as accelerometers, require high sampling rates, but that the data could still be plotted with the encoder data. A further option is to attach a digital video camera synchronized with the time stamp of the data acquisition box in order to perform on-the-spot biomechanical analysis with a laptop computer.

Applications to Sports Outside of BMX Racing

There are several applications where the present inventive data acquisition system described above could be applied outside of BMX racing. Downhill mountain bikers can use similar types of starting gates as BMX races. Short sprint events in track (velodrome) racing also are start-critical.

Another use is for bobsled teams to practice with a mock-up sled mounted on in-line skate wheels. Other uses include unicycles, street luges, soap box derby vehicles and the like. Additional optional equipment may be used in all embodiments, such as voice-command computer links to start or stop data acquisition activities, wearable computers for data storage and processing and computer systems capable of generating holographic displays.

Another embodiment of the present invention is a method of performance evaluation of performing with a human-powered vehicle having one or more wheel(s) wherein measurements of (1) position, velocity and acceleration of said vehicle out of a starting point, whether a starting gate or otherwise, gate and, optionally, one or more corner(s) of a performance track and, optionally, (2) position, velocity, and acceleration and/or conservation of momentum of said vehicle over one or more various obstacles within the performance track are made with a resolution of at least $\frac{1}{64}$ revolution of at least one wheel.

What is claimed is:

1. An apparatus comprising:
   (1) a wheel assembly comprising a wheel,
   (2) a crank shaft assembly and two or more pedals attached to said crank shaft assembly, said crank shall assembly in communication with said wheel,
   (3) a meter assembly, and
   (4) a frame connected to said wheel assembly, said crank shaft assembly, and said metering assembly;
       said meter assembly capable of producing a data set from the rotation of said wheel for determining the location, velocity and acceleration vectors of said frame relative to an initial time and an initial position and being effective to produce a sensitivity of at least about one-half of a revolution of said wheel in said data set to enable resolution of position, velocity and acceleration vectors produced from force applied to each of said pedals and, optionally, a handlebar assembly connected to said frame.

2. The apparatus of claim 1 further comprising a computer assembly capable of recording said data set.

3. The apparatus of claim 1 further comprising a computer assembly capable of calculating said position, velocity and acceleration vectors from said data set.

4. The apparatus of claim 1 wherein said meter assembly comprises an array of first metering devices mounted on said wheel and of second metering devices mounted on said crank shaft assembly or said frame so that said first and second metering devices interact to produce said data set.

5. The apparatus of claim 1 wherein said computer assembly is able to interpret said data to determine said acceleration vectors.

6. The apparatus of claim 1 with a sensitivity of at least about $\frac{1}{1000}$ of a revolution of said first wheel or greater.

7. The apparatus of claim 1 further comprising a handle-bar assembly attached to said frame, and said first and second metering devices further being effective to produce a sensitivity in said data set to enable resolution of acceleration vectors produced from force applied to said handle bar assembly.

8. The apparatus of claim 1 wherein said frame is part of a BMX bicycle.

9. The apparatus of claim 1 wherein said frame is part of a mock-up bobsled mounted on in-line skate wheels.

10. An apparatus comprising a frame comprising
    (1) a wheel assembly comprising a first wheel, two or more pedals, and a crank shaft assembly, said crank shaft assembly in communication with said first wheel and said crank shaft assembly comprising an array of first metering devices,
    (2) structural means in said first metering device for producing a data set containing values, and
    (3) a computer assembly capable of interpreting said data set to determine the location, velocity and acceleration vector relative to an initial position, said first and second metering devices being effective to produce a sensitivity of at least about $\frac{1}{1000}$ in said data set to enable resolution of acceleration vectors produced from force applied to each of said pedals.

11. The apparatus of claim 10 wherein said structural means comprises a laser device effective to provide measurement for producing said data set.

12. The apparatus of claim 10 wherein said structural means comprises an inertial device effective to provide measurement for producing said data set.

13. The apparatus of claim 10 wherein said position, velocity and acceleration vectors are produced from force applied to said pedals and further from force applied to a set of handlebars attached to said apparatus.

* * * * *